United States Patent [19]

Broekhuis et al.

[11] Patent Number: 5,096,965
[45] Date of Patent: Mar. 17, 1992

[54] POLYMERIC COMPOSITIONS

[75] Inventors: Antonius A. Broekhuis; Eit Drent, both of Amsterdam, Netherlands

[73] Assignee: Shell Oil Company, Houston, Tex.

[21] Appl. No.: 369,872

[22] Filed: Jun. 22, 1989

[30] Foreign Application Priority Data

Jun. 27, 1988 [NL] Netherlands ............... 8801633

[51] Int. Cl.$^5$ .................. C08F 261/04; C08F 279/02; C08L 29/04
[52] U.S. Cl. ........................... 525/58; 525/56; 525/59; 525/185; 525/315; 525/471; 525/539
[58] Field of Search ............... 528/392; 525/471, 539, 525/315, 58, 56, 59, 185

[56] References Cited

U.S. PATENT DOCUMENTS

| | | | |
|---|---|---|---|
| 3,694,412 | 9/1972 | Nozaki | 260/63 |
| 4,143,096 | 3/1979 | Hudgin | 260/878 R |
| 4,526,927 | 7/1985 | Hambrecht et al. | 525/68 |
| 4,734,456 | 3/1988 | Motomatsu et al. | 525/207 |
| 4,786,714 | 11/1988 | Drent | 528/392 |
| 4,788,279 | 11/1988 | Drent | 528/392 |
| 4,866,122 | 9/1989 | Gerlowski et al. | 525/58 |
| 4,866,128 | 9/1989 | Gergen et al. | 525/185 |

FOREIGN PATENT DOCUMENTS

| | | |
|---|---|---|
| 121965 | 10/1984 | European Pat. Off. |
| 166182 | 1/1986 | European Pat. Off. |
| 181014 | 5/1986 | European Pat. Off. |
| 213671 | 3/1987 | European Pat. Off. |
| 257663 | 3/1988 | European Pat. Off. |

Primary Examiner—Melvyn I. Marquis
Assistant Examiner—Thomas Hamilton, III
Attorney, Agent, or Firm—James O. Okorafor

[57] ABSTRACT

Polymeric blends of (a) linear alternating polymer of carbon monoxide and at least one ethylenically unsaturated hydrocarbon with (b) reaction product of carbon monoxide and ethylenically unsaturated hydrocarbon with other polymeric material selected from polymeric polyols and diene rubbers are obtained when the linear alternating polymer is produced in the presence of the other polymeric material.

14 Claims, No Drawings

POLYMERIC COMPOSITIONS

FIELD OF THE INVENTION

This invention relates to polymeric compositions comprising a linear alternating polymer of carbon monoxide and at least one ethylenically unsaturated hydrocarbon. More particularly, the invention relates to such polymers modified by the presence of a reaction product of the carbon monoxide and unsaturated hydrocarbon with other polymeric material present during the production of the linear alternating polymer.

BACKGROUND OF THE INVENTION

The class of polymers of carbon monoxide and olefin(s) has been known in the art for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. More recent general processes for the production of such polymers, now becoming known as polyketone polymers or polyketones, are illustrated by a number of published European Patent Applications including 121,965, 181,014, 213,671, and 257,663. The process generally involves the use of a catalyst formed from a Group VIII metal selected from palladium, cobalt or nickel, the anion of a non-hydrohalogenic acid having a pKa below about 6, preferably below 2, and a bidentate ligand containing phosphorous, arsenic, antimony or nitrogen.

The resulting polymers are relatively high molecular weight materials having established utility as premium thermoplastics which are processed by methods which are conventionally employed for thermoplastics into a variety of shaped articles such as containers for food and drink. Although the properties of the polyketone polymers are desirable for many applications, it is useful on occasion to modify the properties of the polyketone polymers. It would be desirable to retain the most useful properties of the polyketone polymers and yet improve other properties. These objects are often accomplished by the provision of a polymer blend.

SUMMARY OF THE INVENTION

The present invention provides blends of a linear alternating polymer of carbon monoxide and at least one ethylenically unsaturated hydrocarbon with another polymeric material. More particularly, the invention relates to blends of the linear alternating polymer with the polymeric reaction product of the carbon monoxide and ethylenically unsaturated hydrocarbon and other polymeric material provided to the polymerization mixture.

DESCRIPTION OF THE INVENTION

The blends of the invention are in situ blends produced when carbon monoxide and at least one ethylenically unsaturated hydrocarbon are polymerized to linear alternating polymer in the presence of other polymeric material selected from polymeric polyols and diene rubber provided to the polymerization mixture. The linear alternating polymer is produced in the polymerization but also a portion of the carbon monoxide and ethylenically unsaturated hydrocarbon react with the other polymeric material present to produce a polymeric reaction product having moieties of the linear alternating polymer components and moieties of the other polymeric material. If desired, the resulting blend of the linear alternating polymer and reaction product may be separated as by contacting the blend with a solvent which is selective for one component or the other, particularly a solvent selective for the linear alternating polymer.

The linear alternating polymer produced as a blend component has been shown to be of the repeating formula —CO—(A)— wherein A is a moiety of ethylenically unsaturated hydrocarbon polymerized through the ethylenic unsaturation. The ethylenically unsaturated hydrocarbons useful as precursors of the polyketone polymer and the polymeric reaction product have up to 10 carbon atoms inclusive and are aliphatic including ethylene and other α-olefins such as propylene, 1-butene, isobutylene, 1-hexene, 1-octane and 1-decene, or are arylaliphatic having an aryl substituent on an otherwise aliphatic molecule, particularly an aryl substituent on a carbon atom of ethylenic unsaturation. Illustrative of this latter class of ethylenically unsaturated hydrocarbons are styrene, p-methylstyrene, p-ethylstyrene and m-methylstyrene. The preferred polyketone polymers are copolymers of carbon monoxide and ethylene or styrene or terpolymers of carbon monoxide, ethylene or styrene and a second hydrocarbon of at least 3 carbon atoms, particularly an aliphatic α-olefin such as propylene. The preferred polymers are therefore represented by the repeating formula

 (I)

wherein G is a moiety of ethylene or styrene polymerized through the ethylenic unsaturation and G' is the moiety of a second hydrocarbon of at least 3 carbon atoms polymerized through the ethylenic unsaturation. The —CO—(G)— units and the —CO—(G')— units are formed randomly throughout the polymer chain and the ratio of y:x is no more than about 0.5 and preferably from about 0.01 to about 0.1.

Although the blends of the invention are suitably produced during the production of either linear alternating copolymers or linear alternating terpolymers, the blends resulting from copolymer production are preferred. These blends are produced when linear alternating copolymers of carbon monoxide and one ethylenically unsaturated hydrocarbon, preferably ethylene or styrene, are produced in the presence of the other polymeric material selected from polymeric polyols or diene rubbers.

The linear alternating polymers are produced by contacting the carbon monoxide and ethylenically unsaturated hydrocarbon in the presence of a catalyst composition formed from a palladium compound, the anion of a non-hydrohalogenic acid having a pKa (measured in water at 18° C.) below 4 and preferably below 2, and a bidentate ligand containing phosphorus or nitrogen. Although a variety of palladium compounds are useful as the precursor of the catalyst composition, palladium carboxylates are preferred and carboxylates such as palladium acetate, palladium propionate, palladium hexanoate and palladium decanoate are suitably employed. Palladium acetate is particularly preferred. The anion is suitably the anion of an inorganic acid such as sulfuric acid or perchloric acid or the anion of an organic acid including the anion of carboxylic acids, e.g., trichloroacetic acid, difluoroacetic acid and trifluoroacetic acid, and sulfonic acids such as methanesulfonic acid, trifluoromethanesulfonic acid and p-toluenesulfonic acid. The anions of trifluoroacetic acid and p-toluenesulfonic acid are preferred. The anion is most satisfactorily provided in the form of the free acid although in an alternate modification the anion is provided in the form of a non-noble transition metal salt, particularly as a copper salt. In yet another modification, the anion and the palladium catalyst composition precursors are provided as a single compound, e.g., palladium p-toluenesulfonate or acetonitrile complexes thereof.

The bidentate ligand is a ligand containing at least one atom of phosphorus or nitrogen. A variety of such bidentate ligands are known to be useful for the production of polyketone polymers and phosphorus-nitrogen, phosphorus-arsenic, and phosphorus-sulfur bidentate ligands are useful in the process to produce the blends of the invention. The preferred bidentate ligands, however, are bidentate ligands of phosphorus or of nitrogen, i.e., ligands which contain two atoms of phosphorus or two atoms of nitrogen, respectively. The bidentate ligands of phosphorus are preferably represented by the formula

(II)

wherein R independently is aromatic of up to 10 carbon atoms inclusive and is hydrocarbyl, e.g., phenyl, tolyl or naphthyl, or is substituted hydrocarbyl containing atoms other than carbon and hydrogen, preferably in the form of lower alkoxy substituents at least one of which is substituted on a carbon atom located ortho relative to the ring carbon atom through which the R group is bound to phosphorus. Illustrative of these groups containing non-hydrocarbyl R substituents are 2-methoxyphenyl, 2-ethoxyphenyl, 2,6-dimethoxyphenyl and 2,4,6-trimethoxyphenyl. The preferred bidentate ligands of phosphorus are those wherein all R groups are the same, particularly wherein the R groups are phenyl or 2-methoxyphenyl. The R group is a divalent bridging group of up to 10 carbon atoms inclusive with from 2 to 4 carbon atoms in the bridge. The preferred R' groups are polymethylene groups, i.e., groups of the formula $-(CH_2)_n-$ wherein n is an integer from 2 to 4 inclusive. Such groups are 1,2-ethylene, 1,3-propylene and 1,4-butylene. The 1,3-propylene or trimethylene group is a preferred R' group. The preferred bidentate ligands of phosphorus are therefore 1,3-bis(diphenylphosphino)propane and 1,3-bis[di(2-methoxyphenyl)phosphino]propane.

The bidentate nitrogen ligands are of the formula

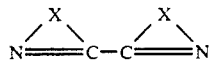

(III)

wherein X independently is a bridging group having from 3 to 4 atoms in the bridge, at least two of which are carbon atoms. Illustrative of such bidentate ligands of nitrogen are 2,2'-bipyridine, 4,4'-dimethyl-2,2'-bipyridine and 1,10-phenanthroline. The preferred bidentate nitrogen ligands of formula III are 2,2'-bipyridine and 1,10-phenanthroline.

In the process of the invention, sufficient catalyst composition is employed to provide from about $1 \times 10^{-7}$ mol to about $1 \times 10^{-3}$ mol of palladium per mol of the ethylenically unsaturated hydrocarbon, preferably from about $1 \times 10^{-6}$ mol to about $1 \times 10^{-4}$ mol per mol of ethylenically unsaturated hydrocarbon. Each of the anion catalyst composition precursors and the bidentate ligand containing phosphorus or nitrogen is suitably provided in a quantity of from about 1 mol to about 1000 mols per mol of palladium but quantities of from about 2 mol to about 100 mols per mol of palladium are preferred. The molar ratio of carbon monoxide to ethylenically unsaturated hydrocarbon is suitably from about 10:1 to about 1:10, but preferably is from about 5:1 to about 1:5.

It is generally useful and on certain occasions required to include within the catalyst composition mixture as a fourth component an organic oxidizing agent. Such oxidants include aliphatic nitrite compounds such as butyl nitrite or hexyl nitrite, aromatic nitro compounds such as nitrobenzene and 2,4-dinitrotoluene, and quinones, both 1,2- and 1,4-quinones. In general, the quinones are the preferred organic oxidants and benzoquinones, naphthoquinones and anthraquinones are satisfactory. The 1,4-quinones are generally preferred over the corresponding 1,2-quinones and particularly preferred is 1,4-benzoquinone. When the other polymeric material present during the formation of the polyketone polymers is a diene rubber, the presence of an organic oxidizing agent is optional although generally preferred. If the oxidant is present, quantities of organic oxidizing agent up to about 10,000 mols per mol of palladium are satisfactory. Quantities of organic oxidizing agent from about 10 mols to about 5000 mols per mol of palladium are preferred. In a second embodiment of the invention the other polymeric material present during production of the linear alternating polymer is a polymeric polyol. In this embodiment the presence of organic oxidizing agent is required and a minimum of 1 mol of oxidant per mol of palladium is provided to the catalyst composition mixture.

The other polymeric materials present during the production of the polyketone polymer are conventional materials well known in the art. The diene rubber, when employed, is an elastomeric polymer having at least a major proportion of a conjugated alkadiene such as butadiene or isoprene. Other conventional unsaturated monomers are usefully copolymerized with the alkadiene and suitable diene rubbers for utilization in the process of the invention are polybutadiene, polyisoprene, styrene/butadiene rubbers of either block or random structure, styrene/isoprene rubbers of both block and random structure, and butadiene/styrene rubbers. Of these, the polybutadiene rubbers are preferred. The polymeric polyol has a plurality of monomeric units within the polymeric chain having hydroxylic substituents attached directly or indirectly to atoms located in the polymeric chain. Illustrative of such polymeric polyols are polyphenols such as poly(p-hydroxystyrene), polyalkenols such as poly(3-butenol) and poly(4-penten-1-ol) and at least partially hydrolyzed polyesters such as at least partially hydrolyzed vinyl alkanoates. The preferred polymeric polyols are the at least partially hydrolyzed polyvinyl alkanoates, particularly at least partially hydrolyzed polyvinyl acetate. The quantity of diene rubber or polymeric polyol to be employed in the production of the blends of the invention will suitably vary within wide limits. It is preferred, however, to employ from about 1 g to about 30 g of polymeric polyol or diene rubber per 100 g of the reaction diluent which is also present in the reaction mixture. Preferred quantities of the other polymeric material are from about 5 g to about 25 g of the polymeric polyol or diene rubber per 100 g of the reaction diluent.

The process of the invention comprises the contacting under polymerization conditions, of the carbon monoxide and ethylenically unsaturated hydrocarbon in the presence of the polymeric polyol or diene rubber, the catalyst composition mixture and a reaction diluent. The most useful reaction diluents are diluents or mixtures of diluents in which the catalyst composition and polyol or diene are soluble, but in which the polymeric compounds to be produced are substantially insoluble. Broadly useful reaction diluents or diluent components include protic reaction diluents such as methanol and ethanol, particularly methanol, hydrocarbon diluents such as cyclohexane and toluene, aprotic polar diluents such as dimethyl sulfoxide and N-methyl-2-pyrolidone, and mixtures thereof. A somewhat special situation exists when the other polymeric material is a polymeric polyol. In such an instance the reaction diluent to be employed should be at least 50% by volume of a polar aprotic reaction diluent and preferably at least 75% by volume of the polar aprotic reaction diluent.

Typical polymerization conditions to be utilized in the production of the blends of the invention include a reaction temperature from about 20° C. to about 150° C., preferably from about 30° C. to about 130° C. The reaction pressure is from about 20 bar to about 150 bar although reaction pressures from about 35 bar to about 100 bar are preferred. Reactant contact is maintained during reaction by conventional methods such as shaking or stirring. Subsequent to the desired degree of reaction the polymerization is terminated by cooling the product mixture and by releasing the pressure. The product blend is normally obtained as insoluble material in the reaction diluent and is recovered by well known procedures such as filtration or decantation. The blend is used as such or is purified by contacting the mixture with a solvent or a complexing agent which is selective for the catalyst residues.

The polymeric product is a blend of a major proportion of the linear alternating polymer and a lesser proportion of a reaction product of the carbon monoxide and ethylenically unsaturated hydrocarbon with the other polymeric material. The precise nature of the reaction product is not known with certainty but, without wishing to be bound by any particular theory, it is thought likely that when the other polymeric material present during polymerization is a diene rubber, the reaction product is a polymer wherein, in effect, linear alternating polymer has been "grafted" on the diene through reaction with residual unsaturation in the diene rubber. When the other polymeric material is a polymeric polyol it is thought likely that the reaction product comprises moieties of linear alternating polymer bound to the polyol by ester linkages. The blend of linear alternating polymer is used as such or the linear alternating polymer component can be separated and removed as by treatment of the product mixture with a solvent which will dissolve the linear alternating polymer but not the reaction product. Hexafluoroisopropanol is an example of such a selective solvent.

The polymeric product of the process of the invention is thermoplastic in character having properties somewhat different from the linear alternating polymer. The polymeric product is processed by procedures which are conventional for thermoplastic products, e.g., extrusion, injection molding and thermoforming, into sheets, films, fibers and shaped articles of established utility such as containers for food and drink and wraps for use in the packaging industry.

The invention is further illustrated by the following Comparative Examples (not of the invention) and the following Illustrative Embodiments which should not be construed to limit the invention.

ILLUSTRATIVE EMBODIMENT I

A product mixture formed when a carbon monoxide/ethylene copolymer is produced in the presence of a butadiene rubber was prepared by charging 100 ml of a solution of 10% by weight butadiene rubber in a cyclohexane to a stirred autoclave of 250 ml capacity. The butadiene rubber had a vinyl content of 10% mol. After addition of 50 ml of toluene, a catalyst composition solution was introduced which comprised 15 ml methanol, 0.1 mmol palladium acetate, 0.2 mmol trifluoroacetic acid and 0.15 mmol 1,3-bis[di(2-methoxyphenyl)-phosphino]propane. After the air present in the autoclave was removed by evacuation, sufficient ethylene to give a pressure of 15 bar and sufficient carbon monoxide to give a total pressure of 45 bar were introduced. The contents of the autoclave were warmed to 90° C. and maintained at that temperature for 5 hours. Polymerization was then terminated by cooling the reactor and contents to room temperature and releasing the pressure. The solid matter was recovered by filtration from the product mixture which resulted and was washed with toluene to remove any unreacted rubber. After drying, 8.1 g of polymeric product was obtained. By $^{13}$C-NMR analysis it was determined that the polymeric product had about 5 units of $+CH_2—CH=CH—CH_2+$ per 100 units of $—CO+CH_2—CH_2+$. A 1 g portion of the product was washed with hexafluoroisopropanol to remove carbon monoxide/ethylene copolymer. The insoluble residue was dried to give 0.3 g of a butadiene/carbon monoxide/ethylene reaction product.

ILLUSTRATIVE EMBODIMENT II

A product mixture formed when a carbon monoxide/styrene copolymer is produced in the presence of a butadiene rubber (vinyl content was 64% mole) was prepared by charging to a stirred autoclave of 250 ml capacity 50 ml of a 10% by weight solution of the butadiene rubber in cyclohexane. After the addition of 50 ml of styrene, a catalyst composition solution was added which comprised 15 ml of methanol, 0.1 mmol of palladium acetate, 0.5 mmol of p-toluenesulfonic acid, 0.3 mmol 2,2′-bipyridine and 20 mmol 1,4-benzoquinone. The air present in the autoclave was removed by evacuation and carbon monoxide was added to give a pressure of 40 bar. The contents of the autoclave were warmed to 80° C. and maintained at that temperature for 5 hours. Polymerization was then terminated by cooling the autoclave and contents to room temperature and releasing the pressure. The solid portion of the product mixture was recovered by filtration and washed with n-octane to remove unreacted rubber.

After drying, the product mixture was 7.1 g. By $^{13}$C-NMR analysis it was determined that this product contained about 2 units of $+CH_2-CH=CH-CH_2+$ per 100 units of $-CO+C_8H_8+$. A 1 g sample of the product mixture was washed with hexafluoroisopropanol to remove the CO/styrene copolymer. After drying, 0.1 g of product remained which was a polybutadiene/carbon monoxide/styrene reaction product.

ILLUSTRATIVE EMBODIMENT III

A reaction product mixture formed when a carbon monoxide/ethylene copolymer is produced in the presence of a butadiene rubber was prepared by a procedure substantially similar to that of Illustrative Embodiment I except that the vinyl content of the butadiene rubber was 41% mol instead of 10% mol, the catalyst composition solution contained 15 ml of methanol instead of 15 ml, the reaction temperature was 80° C. instead of 90° C. and the reaction time was 7 hours instead of 5 hours. After the solid portion of the product mixture had been washed with toluene to remove unreacted rubber and then dried, 11.3 g of polymer product remained. By means of $^{13}$C-NMR analysis it was determined that the polymer product contained 6 units of $+CH_2-CH=CH-CH_2+$ for each 100 units of $-CO+CH_2-CH_2+$.

ILLUSTRATIVE EMBODIMENT IV

A reaction product mixture formed when a carbon monoxide/ethylene copolymer is produced in the presence of a styrene/butadiene rubber was prepared by a procedure substantially similar to that of Illustrative Embodiment I except that the rubber employed was a styrene-butadiene block copolymer having 15.5% mol styrene and in the butadiene portion a vinyl content of 11% mol, the catalyst composition solution contained 10 ml instead of 15 ml of methanol and the reaction temperature was 80° C. instead of 90° C.

After the solid portion of the product mixture was washed with toluene to remove the unreacted styrene/butadiene rubber, 13.1 g of polymeric product remained. By means of $^{13}$C-NMR analysis it was found that the polymeric product contained about 2 units of $+CH_2-CH=CH-CH_2+$ for each 100 units of $-CO+CH_2-CH_2+$.

ILLUSTRATIVE EMBODIMENT V

A reaction product mixture formed when a carbon monoxide/ethylene copolymer is produced in the presence of a polyol was prepared by charging to a stirred autoclave of 250 ml capacity a solution of 5 g of MOWIOL ®4-88 (an 88% hydrolyzed vinyl acetate polymer) in 50 ml of n-methyl-2-pyrrolidone. A catalyst composition mixture comprising 0.1 ml palladium acetate, 1 mmol 2,2'-biphridine, 1 mmol p-toluenesulfonic acid and 20 mmol of 1,4-benzoquinone was then added. After the air present in the autoclave was removed by evacuation, sufficient ethylene was added to give a pressure of 20 bar was added followed by sufficient carbon monoxide to give a total pressure of 50 bar. The contents of the autoclave were heated to 80° C. and maintained at that temperature for 5 hours. The polymerization was then terminated by cooling the reactor and contents to room temperature and releasing the pressure. The solid portion of the resulting product mixture was recovered by filtration and washed with water at 70° C. to remove unreacted polyol. The resulting polymeric product was dried at 70° C. to give 12 g of polymer product. This product was found to be insoluble in hexafluoroisopropanol and considered to be reaction product of partially hydrolyzed polyvinyl acetate, carbon monoxide and ethylene.

ILLUSTRATIVE EMBODIMENT VI

A product mixture formed when a carbon monoxide and ethylene copolymer is produced in the presence of a partially hydrolyzed polyvinyl acetate by a procedure substantially like that of Illustrative Embodiment V, except that the 5 g of MOWIOL ®4-88 was dissolved in a mixture of 100 ml of N-methyl-2-pyrrolidone and 10 ml of methanol instead of 50 ml of n-methyl-2-pyrrolidone. After the final drying, 25.5 g of product remained which was insoluble in hexafluoroisopropanol.

ILLUSTRATIVE EMBODIMENT VII

A product mixture formed when a copolymer of carbon monoxide and ethylene is produced in the presence of a partially hydrolyzed polyvinyl acetate was prepared by a procedure substantially similar to that of Illustrative Embodiment except that the 5 g of MOWIOL ®4-88 was dissolved in a mixture of 100 ml of dimethyl sulfoxide and 10 ml of methanol instead of 50 ml of N-methyl-2-pyrrolidone. After the final drying, 28.2 g of polymeric product remained which was insoluble in hexafluoroisopropanol.

ILLUSTRATIVE EMBODIMENT VIII

A product mixture formed when a copolymer of carbon monoxide and ethylene is produced in the presence of a partially hydrolyzed polyvinyl acetate was prepared by a procedure substantially similar to that of Illustrative Embodiment V except that a solution of 5 g of MOWIOL ®4-88 in a mixture of 100 ml of dimethyl sulfoxide and 5 ml of methanol was employed instead of the solution in N-methyl-2-pyrrolidone, the catalyst composition solution comprised of 0.1 mmol of palladium acetate, 0.15 mmol 1,3-bis(diphenylphosphino)propane, 0.2 mmol p-toluenesulfonic acid and 20 mmol 1,4-benzoquinone. After the final drying 7.5 g of polymer product remained which was insoluble in hexafluoroisopropanol.

COMPARATIVE EXAMPLE I

The procedure of Illustrative Embodiment V was substantially repeated except that the 5 g of MOWIOL ®4-88 was dissolved in 50 ml of methanol instead of in N-methyl-2-pyrrolidone. After the final drying, 15 g of polymer product remained which was completely soluble in hexafluoroisopropanol.

COMPARATIVE EXAMPLE II

The procedure of Illustrative Embodiment V was substantially repeated except that the 5 g of MOWIO ®4-88 was dissolved in a mixture of 100 ml of dimethyl sulfoxide and 10 ml of methanol instead of 50 ml of N-methyl-2-pyrrolidone, and the catalyst composition was formed from 0.1 mmol palladium acetate, 0.15 mmol 1,3-bis(diphenylphosphino)propane and 0.2 mmol of p-toluenesulfonic acid. After the final drying 12 g of polymer product was obtained which was completely soluble in hexafluoroisopropanol.

What is claimed is:

1. A process for the production of a blend of a major proportion of a linear alternating polymer of carbon monoxide and at least one ethylenically unsaturated hydrocarbon with a minor proportion of reaction product of the carbon monoxide, ethylenically unsaturated hydrocarbon and as an other polymeric material polymeric polyol selected from polyphenols, polyalkenols or at least partially hydrolyzed vinyl alkanoates or diene rubber selected from polybutadiene, polyisoprene, styrene/isoprene or butadiene/styrene, by contacting the carbon monoxide, ethylenically unsaturated hydrocarbon and other polymeric material under polymerization conditions in a reaction diluent in the presence of a catalytic quantity of a catalyst composition formed from a palladium compound, the anion of a non-hydrohalogenic acid having a pKa below 2, a bidentate ligand containing phosphorus or nitrogen and optionally an organic oxidizing agent, with the proviso that when the other polymeric material is polymeric polyol and the reaction diluent is at least 50% volume aprotic reaction diluent and optionally at least 1 mol of organic oxidizing agent per mol of palladium is present.

2. The process of claim 1 wherein the linear alternating polymer is a copolymer of carbon monoxide and ethylene or styrene.

3. The process of claim 2 wherein the quantity of catalyst composition is sufficient to provide from about $1 \times 10^{-7}$ mol to about $1 \times 10^{-3}$ mol of palladium per mol of ethylene or styrene, provided as palladium acetate, and in the catalyst composition the anion is present in a quantity of from about 2 mols to about 100 mols per mol of palladium, the bidentate ligand is a bidentate ligand of phosphorus or nitrogen present in an amount from about 2 mols to about 100 mols per mol of palladium, and the organic oxidizing agent is 1,4-benzoquinone present in a quantity up to about 10,000 mols per mol of palladium.

4. The process of claim 3 wherein the anion is the anion of trifluoroacetic acid or p-toluenesulfonic acid.

5. The process of claim 4 wherein the copolymer is a copolymer of carbon monoxide and ethylene.

6. The process of claim 5 wherein the other polymeric material is diene rubber.

7. The process of claim 6 wherein the diene rubber is polybutadiene.

8. The process of claim 7 wherein the bidentate ligand is a ligand of phosphorus selected from 1,3-bis(diphenylphosphino)propane or 1,3-bis[di(2-methoxyphenyl)phosphino]propane.

9. The process of claim 4 wherein the copolymer is a copolymer of carbon monoxide and styrene.

10. The process of claim 9 wherein the other polymeric material is diene rubber.

11. The process of claim 9 wherein the ligand is a ligand of nitrogen selected from 2,2'-bipyridine or 1,10-phenanthroline.

12. The process of claim 4 wherein the other polymeric material is polymeric polyol.

13. The process of claim 12 wherein the copolymer is a copolymer of carbon monoxide and ethylene.

14. The process of claim 13 wherein the ligand is a ligand of phosphorus selected from 1,3-bis(diophenylphosphino)propane or 1,3-bis[di(2-methoxyphenyl)-phosphino]propane.

* * * * *